United States Patent
Levinas et al.

(10) Patent No.: US 7,258,274 B2
(45) Date of Patent: Aug. 21, 2007

(54) MONEY REMITTANCE METHOD

(75) Inventors: Aron Daniel Levinas, Washington, DC (US); Alejandro Jakubowicz, Potomac, MD (US)

(73) Assignee: Micash, Inc, Washington, DC (US)

( * ) Notice: Subject to any disclaimer, the term of this patent is extended or adjusted under 35 U.S.C. 154(b) by 0 days.

(21) Appl. No.: 11/244,098

(22) Filed: Oct. 6, 2005

(65) Prior Publication Data

US 2007/0080210 A1    Apr. 12, 2007

(51) Int. Cl.
- G06Q 40/00 (2006.01)
- G07D 11/00 (2006.01)
- G07F 19/00 (2006.01)
- G06K 5/00 (2006.01)

(52) U.S. Cl. ............ 235/380; 235/379; 705/38; 705/39

(58) Field of Classification Search ........ 235/380, 235/385, 379, 376, 382, 492; 705/38–45, 705/35, 59, 64; 379/114.2, 144.01
See application file for complete search history.

(56) References Cited

U.S. PATENT DOCUMENTS

| | | | | |
|---|---|---|---|---|
| 5,953,710 | A * | 9/1999 | Fleming | 705/38 |
| 6,112,985 | A * | 9/2000 | Weinlaender | 235/380 |
| 6,298,336 | B1 * | 10/2001 | Davis et al. | 705/41 |
| 6,405,182 | B1 * | 6/2002 | Cuervo | 705/43 |
| 2002/0138424 | A1 * | 9/2002 | Coyle | 705/39 |
| 2003/0053609 | A1 * | 3/2003 | Risafi et al. | 379/114.2 |
| 2004/0117316 | A1 * | 6/2004 | Gillum | 705/64 |
| 2005/0102210 | A1 * | 5/2005 | Song et al. | 705/35 |
| 2005/0177496 | A1 * | 8/2005 | Blagg et al. | 705/39 |
| 2005/0185774 | A1 * | 8/2005 | Grear et al. | 379/91.02 |
| 2005/0203857 | A1 * | 9/2005 | Friedman | 705/78 |
| 2005/0216398 | A1 * | 9/2005 | Powers et al. | 705/39 |
| 2005/0269415 | A1 * | 12/2005 | Licciardello et al. | 235/493 |
| 2006/0054683 | A1 * | 3/2006 | Michelsen et al. | 235/379 |

* cited by examiner

*Primary Examiner*—Michael G. Lee
*Assistant Examiner*—Thien T Mai
(74) *Attorney, Agent, or Firm*—Barnes & Thornburg LLP

(57) ABSTRACT

A system wherein a customer is provided with a debit card, cash value is loaded onto the customer's card and a customer account is set up. To allow money remittance, specific information is obtained of the customer and the recipient. These include their names, address, phone number and a recognizable government identification number. The personal information of the customer and the recipient is verified with a government agency. Once the personal information has been verified as acceptable, a recipient's account is established related to the customer's account. The amount of money requested by customer is transferred from the customer's account to the recipient's account. The recipient may be provided with a card providing access to the recipient's account. The recipient may be in the same country or in a foreign country.

10 Claims, 2 Drawing Sheets

MONEY REMITTANCE METHOD

BACKGROUND AND SUMMARY OF THE INVENTION

The present disclosure is directed to a method for remitting money and more specifically to a remittance method including a debit card and a related account.

Debit cards are generally cards by which the customer can make purchases and the amount of the purchase is debited against either prestored value on the card and/or an account which is backed up by an account in a financial institution or merely by an account and financial institution. For some customers, they do not have the capability or wherewithal to open a banking account with a formal financial institution and therefore prepaid debit cards are common. These are used, for example, as phone cards or gifts cards. The present method uses such a reloadable value debit card as a basis for its remittance system.

The present disclosure provides the customer with a debit card, loads cash value on the customer's card and sets up a customer account. To allow money remittance, specific information is obtained of the customer and the recipient. These include their names, address, phone number and a recognizable government identification number. The personal data or information of the customer and the recipient is verified with a government agency. Once the transaction has been verified as acceptable, a recipient's account is established related to the customer's account. The amount of money requested by customer is transferred from the customer's account to the recipient's account. The recipient may be provided with a card providing access to the recipient's account. The recipient may be in the same country or in a foreign country.

To comply with the appropriate regulations, the amount of money that may be loaded onto a customer card or the number of cards issued to the customer is limited. Also there is recording and tracking of all card transfers. A central location verifies the financial transaction, establishes the recipient accounts, and transfers the amount of money from the customer's account to the recipient's account. The operation center provides for obtaining the customer information as well as obtains state and federal licenses to allow authorized agents to sell debit cards and load cash value on the customer card at point-of-sale devices under the licenses. The operation center records and tracks all card-to-account transfers.

These and other aspects of the present disclosure will become apparent from the following detailed description of the invention, when considered in conjunction with accompanying drawings.

DETAILED DESCRIPTION OF THE PREFERRED EMBODIMENTS

Figure 1:
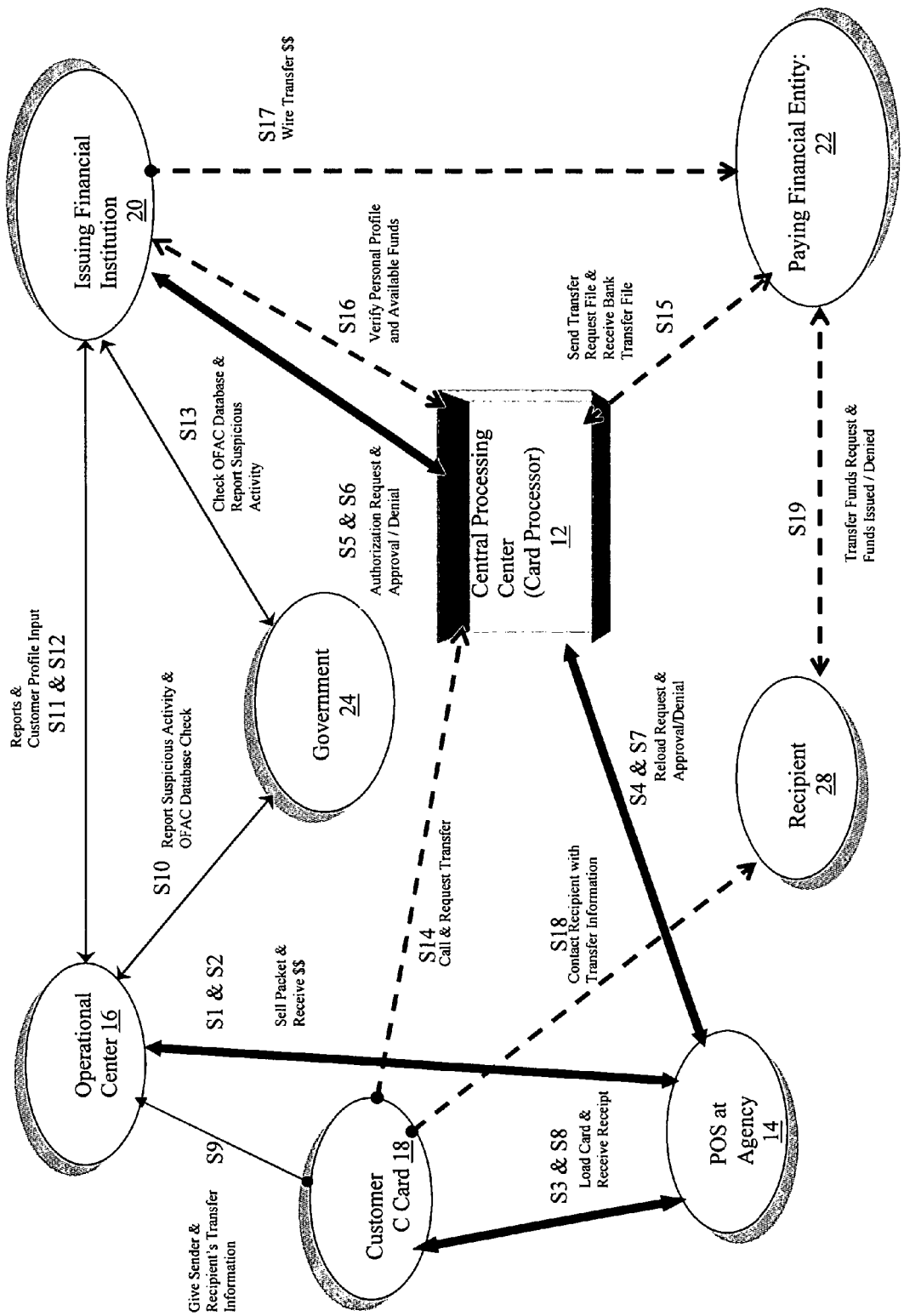
FIG. 1 is a schematic representation of a money remittance system according to the present disclosure.

A schematic of a money remittance system according to the present disclosure is illustrated in FIG. 1. An operational center 16 communicates with a point-of-sale device 14 at an agency and provides cards and receives money at steps S1 and S2. An agent at the POS 14 sells a C card 18 to a customer. The customer then gives the agent at POS 14 cash at step S3. The card includes a PIN and a password under a security label. Before the money can be loaded onto the card 18, the cardholder must enter a PIN verification. The card 18 is then loaded with the amount of money that the customer has provided to the agent at the POS 14. This loading is performed by POS device 14. This information is transmitted to the central processing center 12 at step S4. Upon receipt of the information, the central processing center 12 requests authorization from an issuing financial entity 20 at step S5 and receives approvals at step S6. The central processing center 12 then approves or denies the loading at step S7. If it is accepted, a receipt is printed at the POS 14, step S8. Loading the money or making an initial telephone call activates a customer account at the central processing center 12. The C card 18 then may be used to make purchases at stores as a debit card, at ATM machines, and as a telephone calling card.

The operation center 16 must record the name, address, phone number and a recognizable government identification number of the customer or transmitter and the recipient in a money transfer to provide verification of the transmission. Types of recognizable government identification number are: social security numbers, passport numbers, driver license, ITIN or other governmental agency issued identifications. This information is provided at step S9.

The operation center 16 and the financial entity 20 are responsible for coordinating with governmental agencies 24, respectively, and its responsibility for compliance with various federal and state laws. The operation center 16 and issuing financial entity 20 are responsible for compliancy with the Bank Secrecy Act and for keeping information and providing reports such as the Suspicious Activity Report and the Currency Transaction Report. Operation center 16 also will obtain all the authorizations, registrations and licenses on the federal and state levels dealing with money transfer services. Under the Patriot Act, the operation center 16 will also provide a written anti-money laundering program. One of the government agencies 24 is the Office of Foreign Assets Control ("OFAC") of U.S. Department of Treasury. The operation center 16 coordinates and verifies information with the OFAC. It also verifies the identity of the customer and recipient against the list of specially designated nationals against whom restrictions apply.

As shown in step S10, the operation center 16 reports suspicious activities and performs OFAC database checks. At steps S11 and S12 the operation center 16 provides the issuing financial entity 20 reports and customer profiles and they exchange reports. The financial entity 20, at step S13 also checks the OFAC database and reports suspicious activity.

Central processing center 12 limits the amount of money that can be loaded or transferred on any given day and the number of cards that can be issued to a single customer. This is an effort to keep the cash transactions below $10,000 limits. For example, central process center 12 may only allow daily withdrawal or daily transfer of $830, per card and individual. There is also a daily loading limit of $999 per card.

Money remittance system allows a customer having a C card 18 to remit money to a recipient 28. The C card 18 initiates a call at step S14 to the central processing center 12 to make a transfer after providing the recipient's personal information at step S9 to the operation center 16. This information has been verified as appropriate by checking with the government agency 24 via step S10. The central processing center 12 then sends transfer request file to and receives bank transfer files from a paying financial entity 22 at step S15. Central processing center 12 also verifies personal profile and available funds with the issuing financial entity 20 at step S16. When all the accounts have been set up in the issuing financial entity 20 and the paying financial entity 22, funds are transferred via step S17 from the issuing financial entity 20 to the paying financial entity 22. The customer 18 informs the recipient 28 in step S18 of the transfer of money and its availability. Recipient 28 then can request access to the transferred money from the paying financial entity 22 in step S19. Although the initial system was set up that the issuing financial entity 20 was in the United States and the paying financial entity 22 is in a foreign country, the same procedure can be if the issuing financial entity 20 and the paying financial entity 22 are in the same country.

Figure 2:
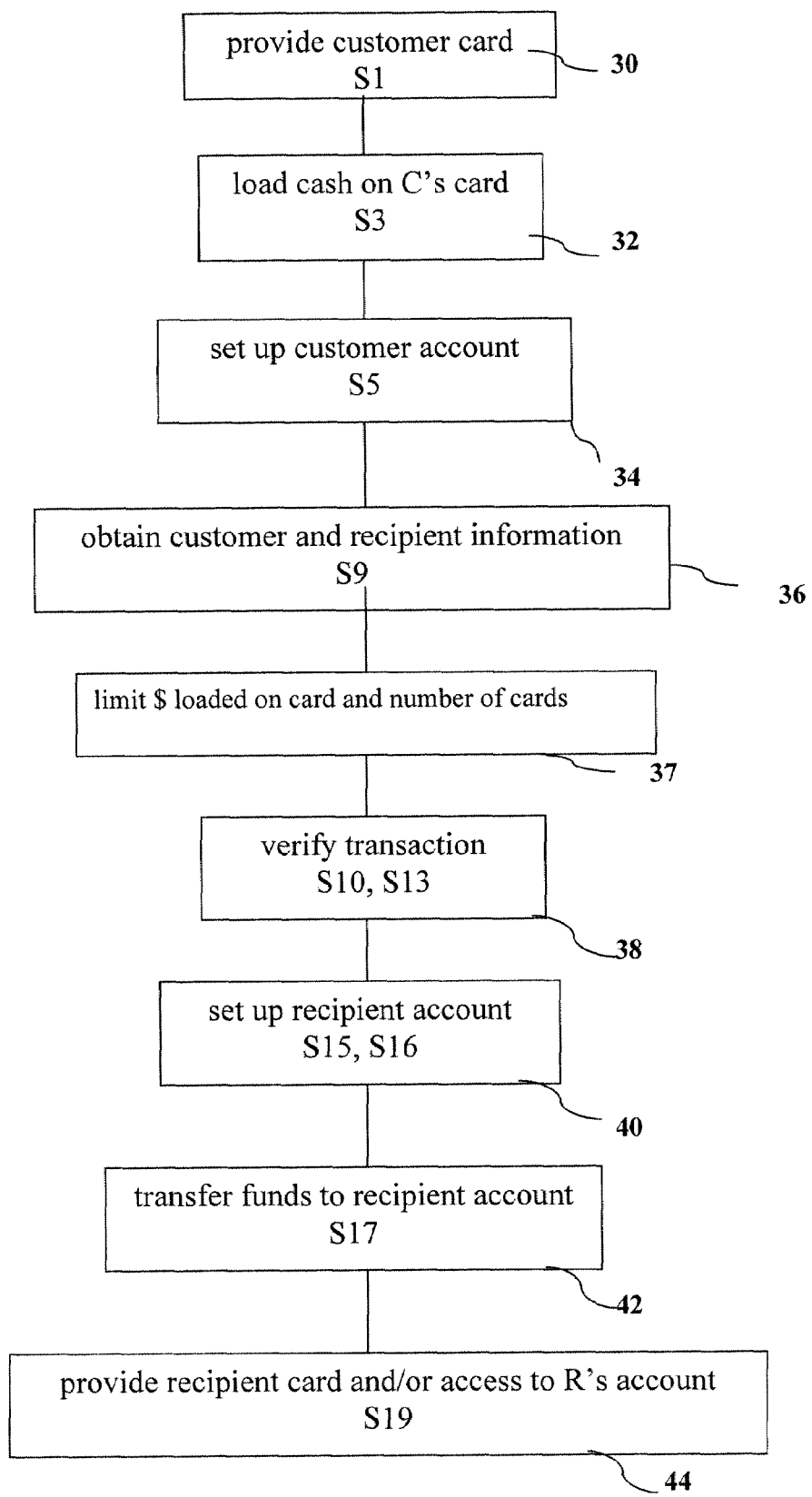
FIG. 2 is a schematic representation of a money remittance method according to the present disclosure.

A general overview of the present process is specifically described in FIG. 2. Where appropriate, the corresponding steps from FIG. 1 are shown. As previously described, a C card 18 is provided to a customer at step 30. Cash value is loaded onto the card at step 32 at POS 14. The customer account is activated at step 34 by the central process center 12. For remittance, customer and recipient information is obtained at step 36 by the central process center 12. Central processing center 12 limits the amount of money that can be loaded or transferred on any given day and the number of cards that can be issued to a single customer at step 37. The information relative to the customer and the recipient of the money transfer transaction are verified at step 38 by consulting with the government agency 24. A recipient account is aligned with an existing account or is set up at step 40 by paying financial entity 22. The recipient account set up by the paying financial entity 22 is communicated to issuing financial entity 20. The central processing center 12 then links the recipient's account to the customer account. The customer requested transfer of funds from C card 18 to a recipient account is performed at step 42. This is performed by the central processing center 12. A recipient card 28 is available for the recipient which allows access to the recipient account at step 44. The recipient using the recipient card 28 can use it for withdrawals from its account. It is limited to the amount of money on the recipient card 28 or in its related account. Where the recipient is in a foreign country, the recipient goes to the paying financial entity 22 and provides appropriate identification to receive the recipient card 28.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A method authorizing remittance of money by a non-financial institution comprising:
   providing a customer with a debit card;
   loading cash value on the customer's card and setting up a customer account;
   obtaining from the customer a) customer's name, customer's address, and customer's phone number and b) a recipient's name, recipient's address, recipient's phone number, and recipient's recognizable government identification number;
   limiting the amount of money that may be loaded onto the customer's card and the number of cards issued to the customer by a central processing center of the non-financial institution to comply with government restrictions;
   verifying the personal information and the ability to transfer money of the customer and the recipient with the Office of Foreign Assets Control of the United States Treasury;
   establishing a recipient account related to the customer's account after verification;
   authorizing transfer of requested amount of money from the customer's account to the recipient's account; and
   providing the recipient access to the recipient's account.

2. The method according to claim 1, wherein the account is established in a financial institution in a foreign country and the recipient's acess is provided in the foreign country.

3. The method according to claim 1, including recording and tracking all card to account transfers.

4. The method according to claim 1, including obtaining state and federal licenses for money remittance and authorizing agents to sell debit cards and load cash value on the customer cards at point of sale devices under the licenses.

5. The method according to claim 1, including using a central location for obtaining, verifying, establishing and authorizing transferring of money.

6. The method according to claim 1, including providing the recipient a card which provides access to the recipient's account at a financial institution.

7. The method according to claim 1, including monitoring and limiting loading of cash, transferring of money and accessing by recipient to comply with government money laundering restrictions.

8. The method according to claim 7, including reporting suspicious activities.

9. The method according to claim 1, including obtaining from the customer a customer's recognizable government identification number.

10. The method according to claim 1, wherein the recipient's account is set up in a financial institution and the money is transferred via financial institutions.

* * * * *

UNITED STATES PATENT AND TRADEMARK OFFICE
CERTIFICATE OF CORRECTION

| | |
|---|---|
| PATENT NO. | : 7,258,274 B2 |
| APPLICATION NO. | : 11/244098 |
| DATED | : August 21, 2007 |
| INVENTOR(S) | : Aaron Daniel Levinas et al. |

It is certified that error appears in the above-identified patent and that said Letters Patent is hereby corrected as shown below:

On the title page, Item (75) Inventors:, "Aron" should read --Aaron--.

Signed and Sealed this

Eleventh Day of December, 2007

JON W. DUDAS
*Director of the United States Patent and Trademark Office*